United States Patent
Bhardwaj et al.

(10) Patent No.: US 10,655,277 B2
(45) Date of Patent: May 19, 2020

(54) BIOPOLYMER COATING FOR COMPOSTABLE PAPERBOARD PACKAGING

(71) Applicant: WestRock MWV, LLC, Atlanta, GA (US)

(72) Inventors: Rahul Bhardwaj, Glen Allen, VA (US); Chitai C. Yang, Mechanicsville, VA (US); Chester E. Alkiewicz, Glen Allen, VA (US)

(73) Assignee: WestRock MWV, LLC, Atlanta, GA (US)

( * ) Notice: Subject to any disclaimer, the term of this patent is extended or adjusted under 35 U.S.C. 154(b) by 0 days.

(21) Appl. No.: 15/776,925

(22) PCT Filed: Nov. 16, 2016

(86) PCT No.: PCT/US2016/062136
§ 371 (c)(1),
(2) Date: May 17, 2018

(87) PCT Pub. No.: WO2017/091392
PCT Pub. Date: Jun. 1, 2017

(65) Prior Publication Data
US 2018/0327976 A1    Nov. 15, 2018

Related U.S. Application Data

(60) Provisional application No. 62/259,872, filed on Nov. 25, 2015.

(51) Int. Cl.
| | | |
|---|---|---|
| B29B 7/04 | (2006.01) |
| D21H 27/18 | (2006.01) |
| D21H 27/10 | (2006.01) |
| D21H 19/42 | (2006.01) |
| B32B 27/36 | (2006.01) |
| D21H 19/80 | (2006.01) |
| D21H 27/30 | (2006.01) |
| D21H 19/56 | (2006.01) |
| B32B 7/12 | (2006.01) |
| B32B 27/22 | (2006.01) |
| B32B 27/10 | (2006.01) |
| B32B 27/18 | (2006.01) |
| B32B 7/04 | (2019.01) |
| B32B 27/30 | (2006.01) |
| B65D 65/42 | (2006.01) |
| B65D 65/46 | (2006.01) |
| D21H 19/40 | (2006.01) |
| D21H 19/62 | (2006.01) |
| D21H 19/82 | (2006.01) |

(52) U.S. Cl.
CPC ............... *D21H 27/18* (2013.01); *B32B 7/04* (2013.01); *B32B 7/12* (2013.01); *B32B 27/10* (2013.01); *B32B 27/18* (2013.01); *B32B 27/22* (2013.01); *B32B 27/308* (2013.01); *B32B 27/36* (2013.01); *B65D 65/42* (2013.01); *B65D 65/466* (2013.01); *D21H 19/40* (2013.01); *D21H 19/42* (2013.01); *D21H 19/56* (2013.01); *D21H 19/62* (2013.01); *D21H 19/80* (2013.01); *D21H 19/82* (2013.01); *D21H 27/10* (2013.01); *D21H 27/30* (2013.01); *B32B 2250/02* (2013.01); *B32B 2250/03* (2013.01); *B32B 2250/40* (2013.01); *B32B 2264/10* (2013.01); *B32B 2264/102* (2013.01); *B32B 2264/104* (2013.01); *B32B 2264/107* (2013.01); *B32B 2307/31* (2013.01); *B32B 2307/7163* (2013.01); *B32B 2307/732* (2013.01); *B32B 2307/748* (2013.01); *B32B 2439/40* (2013.01)

(58) Field of Classification Search
USPC ........................................................ 162/137
See application file for complete search history.

(56) References Cited

U.S. PATENT DOCUMENTS 7,816,286 B1    10/2010    Ahmed

FOREIGN PATENT DOCUMENTS

| WO | WO 98/53141 A1 | 11/1998 |
| WO | WO 99/37707 A1 | 7/1999 |
| WO | WO 2009/064052 A1 | 5/2009 |

*Primary Examiner* — Mark Halpern
(74) *Attorney, Agent, or Firm* — WestRock Intellectual Property Group (57) ABSTRACT

A coating for paperboard includes polylactic acid and an inorganic material. The inorganic material may be talc. The presence of the talc has a beneficial effect on extrusion processing behavior including lower melt temperature, lower head pressure, and lower motor load. Additionally, the presence of talc reduces edge weave and neck-in during extrusion coating processes.

21 Claims, 7 Drawing Sheets

BIOPOLYMER COATING FOR COMPOSTABLE PAPERBOARD PACKAGING

This application is a 371 of PCT/US2016/062136 filed 16 Nov. 2016.

REFERENCE TO RELATED APPLICATIONS

This application claims the benefit of priority under 35 U.S.C. § 119(e) of U.S. provisional application Ser. No. 62/259,872 filed on Nov. 25, 2015, which is hereby incorporated by reference in its entirety.

TECHNICAL FIELD

The present invention relates to a biopolymer coating structure, and more specifically to a biopolymer coating structure including an inorganic component and having improved extrusion processing characteristics.

BACKGROUND

In the field of packaging it is often desired to provide a packaging structure with a polymeric coating. Such polymeric coatings may impart durability, moisture resistance, and other useful properties such as heat-sealability. Recently there is increasing interest in using biopolymers for the polymer coating in such packaging structures. One popular biopolymer is polylactic acid (PLA). However, PLA presents challenges when used in an extrusion coating process, including adhesion to paperboard, heat sealability, and large scale edge weave and neck-in.

SUMMARY

The present disclosure is a paperboard coated on at least one surface with a PLA coating containing an inorganic material. In one embodiment, the inorganic material is talc. A small amount of talc has been discovered to significantly reduce edge weave and also to reduce neck-in behavior of the extruded material.

Within the scope of this application it is envisaged and intended that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Exemplary embodiments of the invention will now be described with reference to the accompanying drawings, in which.

DETAILED DESCRIPTION OF EMBODIMENTS

Detailed descriptions of specific embodiments of the packaging material are disclosed herein. It will be understood that the disclosed embodiments are merely examples of the way in which certain aspects of the invention can be implemented and do not represent an exhaustive list of all of the ways the invention may be embodied. As used herein, the word "exemplary" is used expansively to refer to embodiments that serve as illustrations, specimens, models, or patterns. Indeed, it will be understood that the packaging materials described herein may be embodied in various and alternative forms. Any specific structural and functional details disclosed herein are not to be interpreted as limiting, but merely as a basis for the claims and as a representative basis for teaching one skilled in the art to variously employ the invention.

Figure 1A:
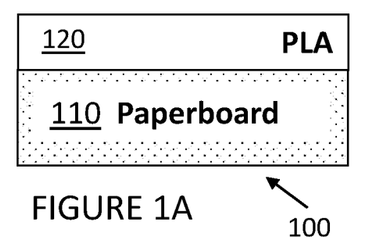
FIGS. 1A-1E are simplified cross section views of paperboard structures each having a polymer coating.

FIG. 1A shows a simplified cross section diagram of a first packaging material 100 including a paperboard 110 with a polymer coating 120, here being polylactic acid (PLA). The PLA may be an unmodified PLA such as Ingeo™ biopolymer from NatureWorks LLC.

The thicknesses shown in FIG. 1A-1E are not to scale. For example, the paperboard may range in thickness from 0.01 inches to 0.03 inches (10 to 30 pt). The thickness of the coating may be from 0.0025 to 0.005 inches. The coating may be applied, for example, by extrusion coating onto paperboard.

Figure 1B:
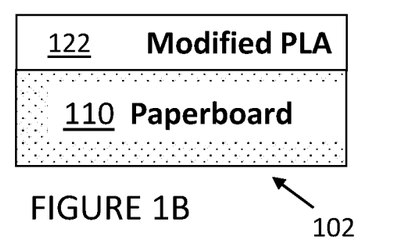

FIG. 1B shows a simplified cross section diagram of a second packaging material 102 including a paperboard 110 with a polymer coating 122, here being a modified PLA, for example Danimer 26806 from Danimer Scientific LLC. The coating 122 may be applied, for example, by extrusion coating onto paperboard. Coating 122 may also be referred to herein as "coating G1."

Figure 1C:
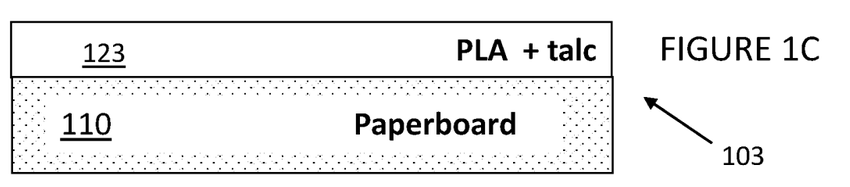

FIG. 1C shows a simplified cross section diagram of a third packaging material 103 including a paperboard 110 with a polymer coating 123, here being a blend of PLA with an inorganic material such as talc. Coating 123 may be applied, for example, by extrusion coating onto paperboard. Coating 123 is not meant to be limited to PLA, but may include other biopolymers, biodegradable polymers, and compostable polymers. Coating 123 may be up to 98% bio-based polymer. Whether a polymer is bio-based can be determined by the ASTM D6866 Test Method that measures bio-based carbon content by the Carbon-14 dating technique.

It is often desired to have a paperboard that is compostable. The inventive paperboard here may be compostable. The ASTM D6868-11 Standard Specification for compostability of paper or paperboard requires any non-biodegradable organic constituent to be <1% of the dry weight of the finished product, and the total portion of organic constituents that are not biodegradable cannot exceed 5% of the total weight.

Figure 1D:
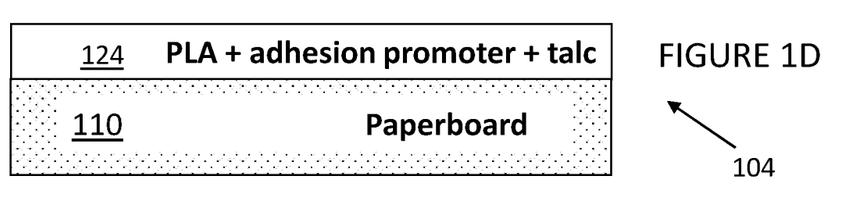

FIG. 1D shows a simplified cross section diagram of a fourth packaging material 104 including a paperboard 110 with a polymer coating 124, here being a blend of PLA, an adhesion promoter, and an inorganic material such as talc.

The PLA may be an unmodified PLA such as Ingeo™ biopolymer from NatureWorks LLC. The adhesion promoter may be selected from at least one of the following groups: aliphatic-polyesters, aliphatic-aromatic polyesters, acrylic polymers, elastomers, plasticizers, and other adhesion promoters. As an example the adhesion promoter may be Ecovio® PS 1606 from BASF Corporation. The inorganic material may be selected from calcium carbonate, talc, mica, diatomaceous earth, silica, clay, kaolin, wollastonite, pumice, zeolite, ceramic spheres, and the like. A preferred mineral is talc which may be added via a PLA-talc master batch (MB). The PLA-talc master batch may contain up to 60% talc. As an example the master batch may contain about 40% talc.

Coating 124 is not meant to be limited to PLA, but may include other biopolymers, biodegradable polymers, and compostable polymers. Coating 124 may be up to 98% bio-based polymer. Whether a polymer is bio-based can be determined by the ASTM D6866 Test Method that measures bio-based carbon content by the Carbon-14 dating technique.

The coating 124 may be applied, for example by extrusion coating onto paperboard 110. Coating 124 may also be referred to herein as "Coating G2." Coating 124 may be applied, for example by extrusion coating onto paperboard 110 on one or both sides. Good results were obtained with 70% polylactic acid (PLA), 15% adhesion promoter, and 15% of the PLA-talc master batch (MB). Thus with the master batch containing 40% talc, the coating 124 may contain about 6% talc. Good results were also obtained with 65% polylactic acid (PLA), 10% adhesion promoter, and 25% of the PLA-talc master batch (about 10% talc in the coating).

Figure 1E:
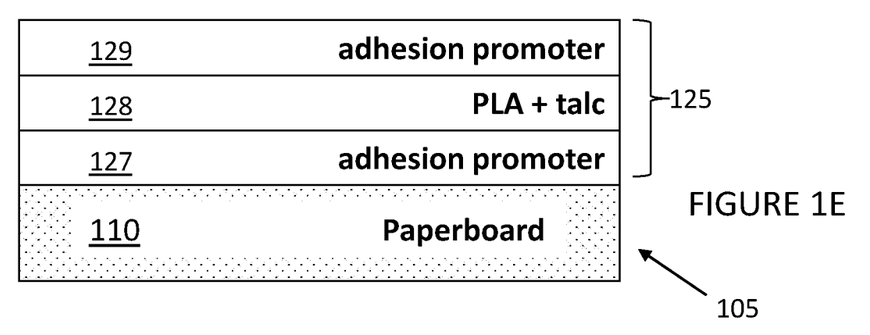

The coating may also be applied as a co-extrusion coating. For example, FIG. 1E shows a simplified cross section diagram of a fifth packaging material 105 including a paperboard 110 with a polymer coating 125, here being a coextruded coating including a layer 128 of PLA with talc, between an inner layer 127 of adhesion promoter (in contact with paperboard 110) and an outer layer 129 of adhesion promoter (an outermost surface of the packaging material 105). The PLA and adhesion promoter may be as described above. The composition of layers 127, 128, 129 may be varied somewhat without departing from the scope of the invention.

Figure 2:
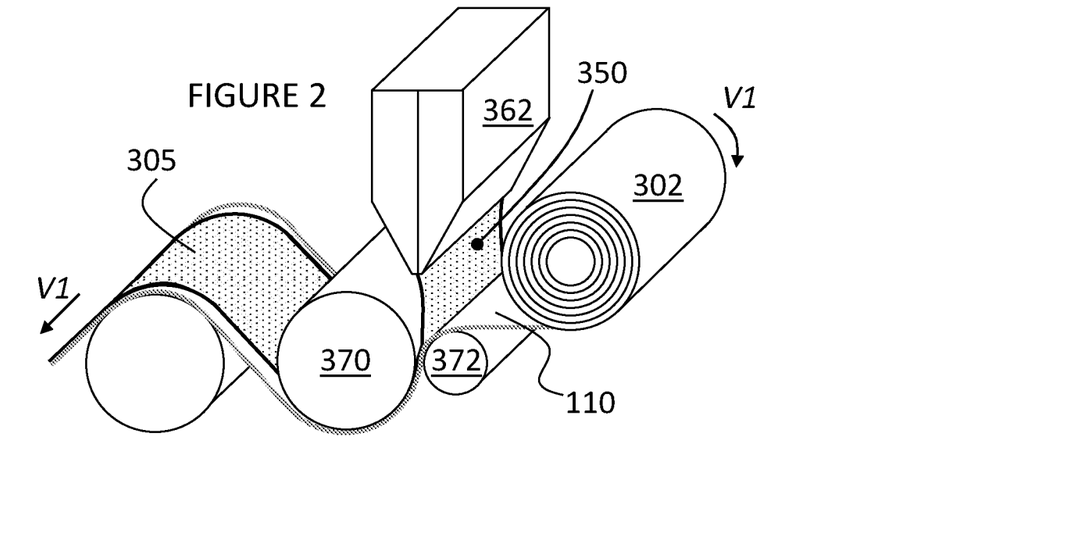
FIG. 2 is a perspective view of an extrusion coater.

FIG. 2 shows a simplified drawing of an extrusion coater where extruder die 362 applies a curtain 350 of polymer onto a paperboard substrate 110 being unrolled at a linear speed V1 from feed roll 302. The paperboard substrate 110 and curtain 350 are pressed together in a nip between pressure roll 372 and chill roll 370 which cools the polymer before the coated paperboard 305 moves on to another step in the process.

Figure 3:
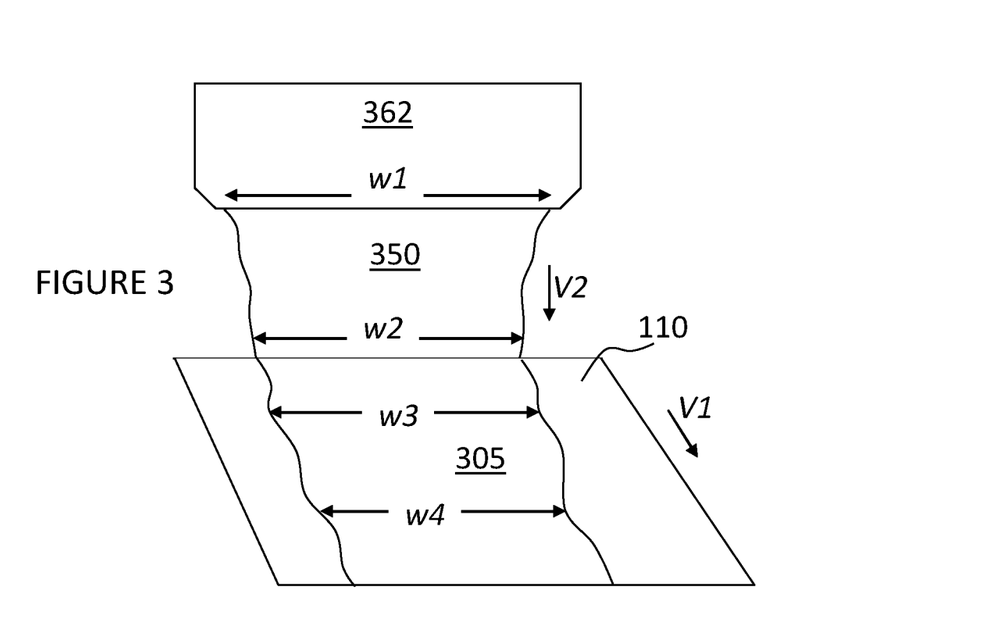
FIG. 3 is a front view of an extruded coating being applied to paperboard.

FIG. 3 shows a front view of the extrusion coating process. On leaving the extruder die 362, the curtain 350 of polymer may have a width w1 that may depend on processing conditions including composition, temperature, and feed rate of the polymer, slot opening in the extruder die, and position of deckle rods within the die. Also dependent on these factors is the linear speed V2 of curtain 350. If the slot opening is T1 mils, the resulting film thickness T2 of the polymer on the coated paperboard 305 will be approximately T1*V2/V1 mils. Usually the paperboard speed V1 will be several times greater than the curtain speed V2, and the film thickness T2 will correspondingly be several times less than T1.

The curtain 350 as it leaves the extruder die 362 may have an initial width w1 but may 'neck down' to a lesser width w2 as it is applied to the substrate 110. The neck-down calculated as a percentage is equal to 100%*(w1−w2)/w1.

Another processing defect that sometimes occurs and causes waste material is "edge weave," where the edges of the curtain of polymer 350 waver sideways. This wavering of the curtain is exhibited by wavy edges of the coated portion 305 on the paperboard 110. With non-uniform coverage at the edges, more of the sides of the substrate need to be trimmed as waste. In FIG. 3, edge weave is depicted in a simplistic manner by the wavy edge of the coating, and the fact that the coated width may vary along the length of the web as depicted by widths w3 and w4.

Figure 4:
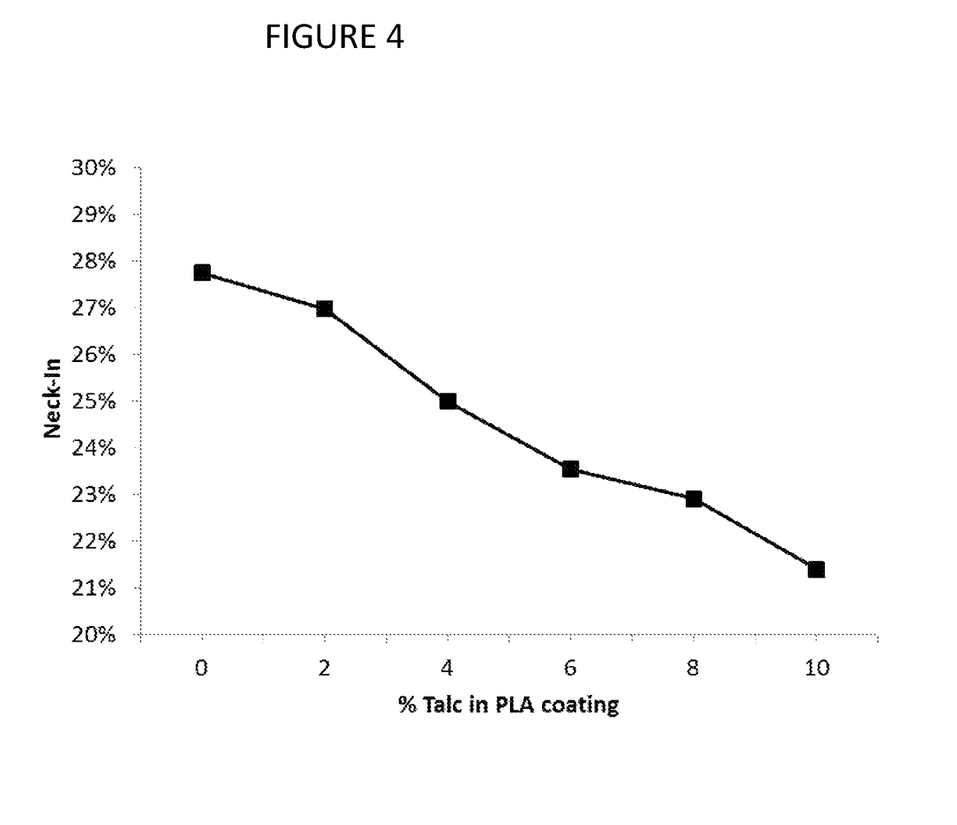
FIG. 4 is a graph showing the effect of talc addition on PLA neck-in during extrusion processing.

FIG. 4 shows the effect that talc addition has on neck-in during extrusion coating of unmodified PLA. The addition of talc to the PLA surprisingly reduces the neck-in from about 28% for 100% PLA to about 22% when 10% talc has been added. Thus, talc acts as a melt curtain stabilizer. It is hypothesized that other materials such as calcium carbonate, talc, mica, diatomaceous earth, silica, clay, kaolin, wollastonite, pumice, zeolite, ceramic spheres, and the like may be utilized as melt curtain stabilizers.

Figure 5:
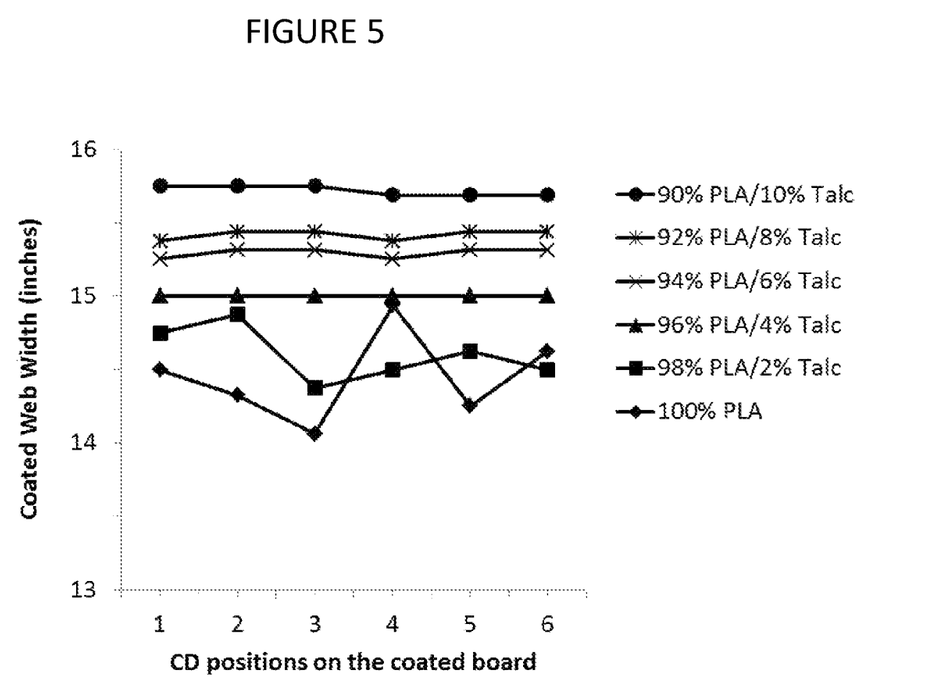
FIG. 5 is a graph showing the effect of talc addition on edge weave during extrusion processing of PLA.

FIG. 5 shows the effect of talc addition on edge weave during extrusion coating of otherwise unmodified PLA. The graph shows the width of the web that is coated with the polymeric coating, as a function of distance along the web. With no talc addition (e.g., the structure depicted in FIG. 1A), the coated width averages about 14.5 inches, and ranges from 14 to 15 inches. As talc is added, the coated width increases and the width variability decreases, so that with 10% talc addition, the coated width is about 15.7 inches, and the variability only a few tenths of an inch.

Figure 6:
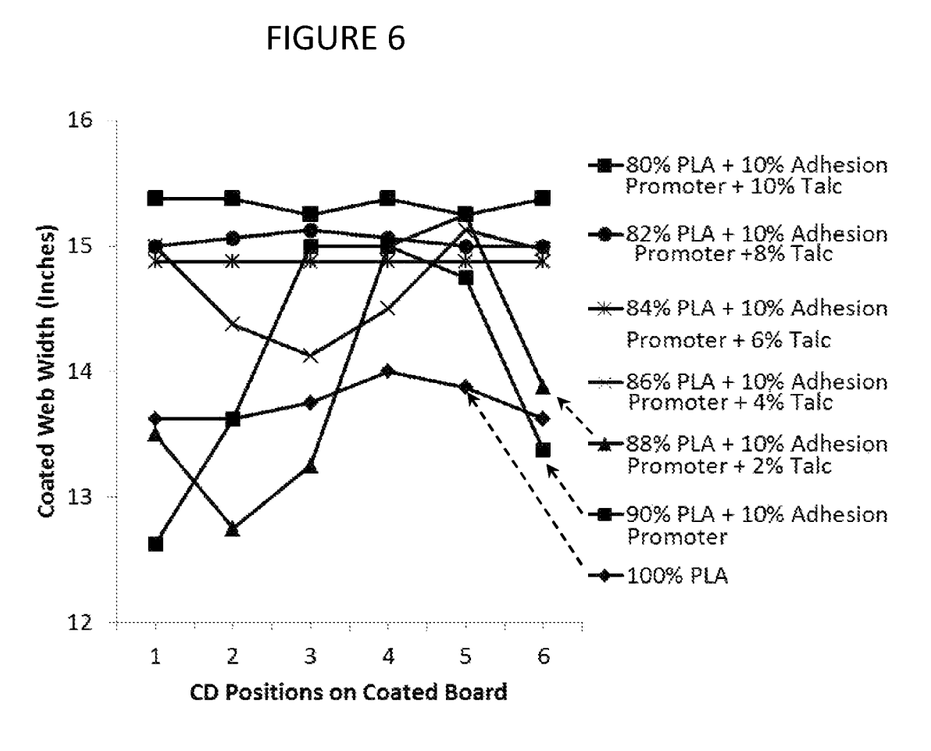
FIG. 6 is a graph showing the effect of talc addition on edge weave during extrusion processing of PLA blended with an adhesion promoter.

FIG. 6 shows the effect of talc addition on edge weave during extrusion coating of PLA blended with an adhesion promoter (e.g. the structure depicted in FIG. 1C). Toward the bottom of the graph is shown the behavior of unmodified 100% PLA. The coated web width is slightly less than 14 inches. Also near the bottom of the graph is shown the behavior of PLA with 10% adhesion promoter, where the coated width varies from 13 to 15 inches, and shows undesirable edge weave. The remainder of the lines toward the top of the graph are PLA with 10% adhesion promoter, but additionally with increasing amounts of talc. With 2% talc addition, the coated width varies between 14 to 15 inches. Talc additions of 4% or greater stabilize the coated width so there is little variation (only fractions of an inch), and the coated width is increased to about 15" or higher.

Figure 7:
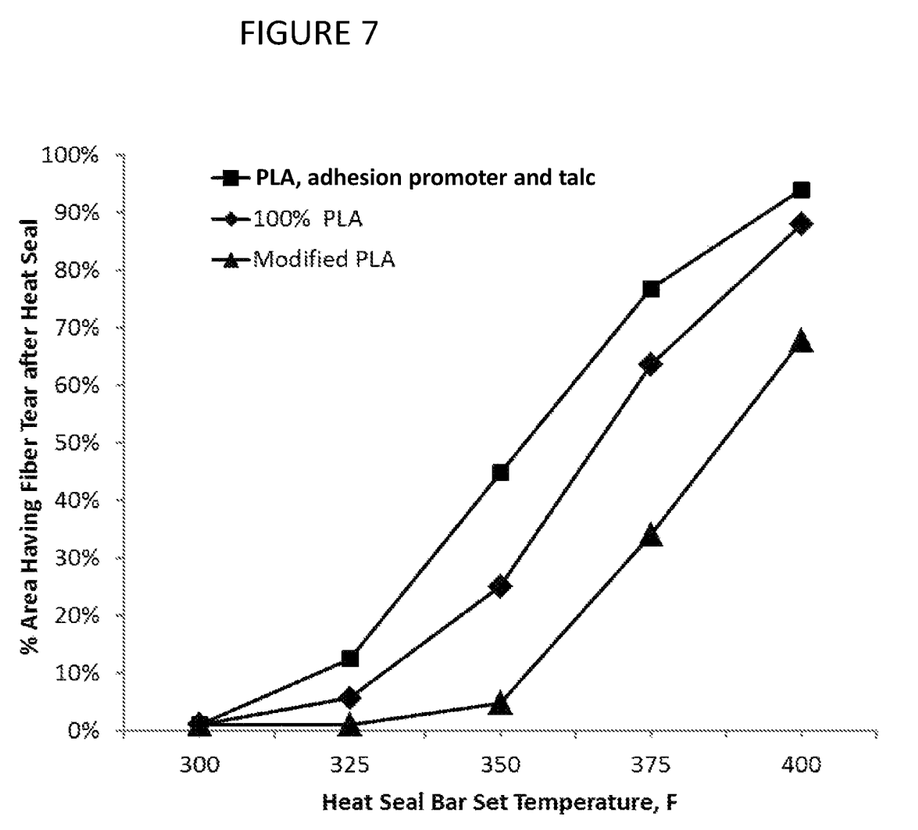
FIG. 7 is a graph comparing the poly-to-paperboard adhesion of three biopolymer coatings after heat sealing.

FIG. 7 compares the polymer-to-paperboard heat sealing performance of unmodified PLA, modified PLA, and PLA with adhesion promoter and talc. The x-axis is the setpoint temperature of the heat seal bar, and the y-axis heat seal rating is the percentage of the sealed surface area where the fiber is torn when the polymer coating is peeled from the paperboard. At any given heat seal bar temperature, the strongest seal is with the PLA/adhesion promoter/talc, and the weakest seal is with the modified PLA.

At a heat seal bar temperature of 325 F, there is no fiber tear with the modified PLA coating, while 10% fiber tear is exhibited with the PLA/adhesion promoter/talc coating. At heat seal bar temperatures of 350 F and higher, the fiber tear area is more than 40% for the PLA/adhesion promoter/talc coating.

Figure 8:
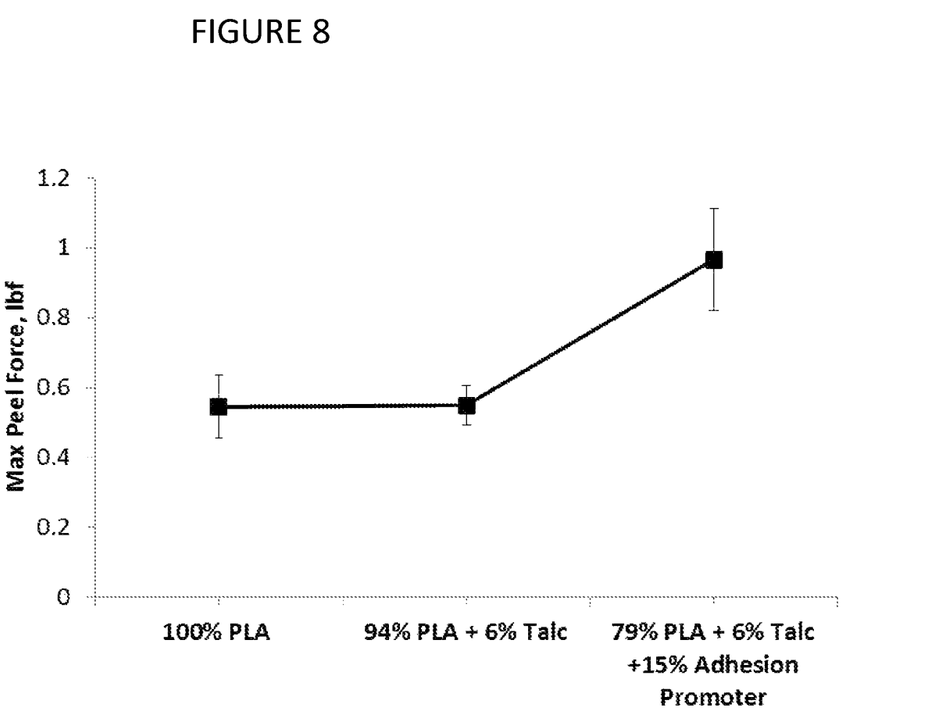
FIG. 8 is a graph comparing maximum peel force of three biopolymer coatings after the extrusion coating process.

FIG. 8 compares the maximum peel force required to separate the polymer coating from paperboard after extrusion coating, for 100% PLA, PLA with 6% talc, and PLA with 6% talc and 15% adhesion promoter. The maximum peel force is approximately the same for the 100% PLA and the PLA with 6% talc. The maximum peel force is significantly greater when 15% adhesion promoter has been added to the PLA/talc coating.

Table 1 compares processing characteristics of the 100% PLA (structure 100) with a modified PLA (structure 102; PLA G1) and the blend of PLA/adhesion promoter/talc (structure 104; PLA G2). The PLA G2 with talc and adhesion promoter has improved processing conditions insofar as the melt temperature, extruder head pressure, and motor load are all reduced compared with either unmodified PLA or modified PLA. Relative to unmodified PLA, the PLA G2 neck-in and peel force are also improved. The PLA G2 neck-in and peel force are not quite as good as for modified PLA; however as seen above the PLA G2 structure has significantly better fiber-tear performance than the modified PLA.

TABLE 1

Processing properties

| Properties measured at 150 fpm line speed | 100% PLA | Modified PLA (PLA G1) | PLA with adhesion promoter and talc (PLA G2) |
|---|---|---|---|
| Extruder Melt Temperature | 461 F. | 482 F. | 451 F. |
| Extruder Head Pressure | 1650 psi | 2600 psi | 1340 psi |
| Extruder Motor Load | 57% | 69% | 52% |
| Average Coat width, inches | 14.5 ± 0.31 | 16.0 ± 0.02 | 15.0 ± 0.22 |
| Neck-in Percent (20" die) | 27.5% | 19.8% | 25.0% |
| Adhesion to board, maximum peel force | 0.54 ± 0.09 lbf | 1.09 ± 0.1 lbf | 0.92 ± 0.2 lbf |
| Adhesion to board, average peel force | 0.32 ± 0.03 lbf/inch | 0.79 ± 0.08 lbf/inch | 0.63 ± 0.15 lbf/inch |

The invention claimed is:

1. A paperboard structure comprising:
   a paperboard substrate having a first surface and an opposed second surface; and
   a heat sealable biopolymer coating applied by extrusion or co-extrusion to at least one of the first and second surfaces;
   wherein the heat sealable biopolymer coating comprises an inorganic melt curtain stabilizer,
   wherein the heat sealable biopolymer coating optionally further comprises an adhesion-promoting polymer, and
   wherein the thickness of the heat sealable biopolymer coating is from 0.00025 to 0.005 inches.

2. The paperboard structure of claim 1, wherein the melt curtain stabilizer comprises at least one of calcium carbonate, talc, mica, diatomaceous earth, silica, clay, kaolin, wollastonite, pumice, zeolite, and ceramic spheres.

3. The paperboard structure of claim 1, wherein the heat sealable biopolymer coating comprises a biodegradable polymer.

4. The paperboard structure of claim 1, wherein the heat sealable biopolymer coating comprises a biodegradable polyester.

5. The paperboard structure of claim 4, wherein the biodegradable polyester comprises polylactic acid.

6. The paperboard structure of claim 1, wherein the heat sealable biopolymer comprises the adhesion-promoting polymer, and wherein the adhesion-promoting polymer comprises at least one of aliphatic-aromatic copolyester polybutylene succinate, polyhydroxyalkanoate, aliphatic-polyester, aliphatic-aromatic polyester, acrylic polymer, elastomer, and plasticizer.

7. The paperboard structure of claim 1, wherein the heat sealable biopolymer coating is one of a monolayer blend and a co-extruded multilayer blend.

8. The paperboard structure of claim 1, wherein the melt curtain stabilizer is from 1% to 25% by weight of the heat sealable biopolymer coating.

9. The paperboard structure of claim 8, wherein the melt curtain stabilizer is from 2% to 18% by weight of the heat sealable biopolymer coating.

10. The paperboard structure of claim 9, wherein the melt curtain stabilizer is from 4% to 12% by weight of the heat sealable biopolymer coating.

11. The paperboard structure of claim 1, having a polymer to paper heat seal with at least 10% fiber tear when sealed with a heat seal bar temperature of 325° F. under a 60 psi seal pressure at a 1.5 sec dwell time.

12. The paperboard structure of claim 1, having a polymer to paper heat seal with at least 40% fiber tear when sealed with a heat seal bar temperature of 350° F. under 60 psi seal pressure at a 1.5 sec dwell time.

13. The paperboard structure of claim 1, having a polymer to paper heat seal with at least 70% fiber tear when sealed with a heat seal bar temperature of 375° F. under 60 psi seal pressure at a 1.5 sec dwell time.

14. The paperboard structure of claim 1, wherein the paperboard structure meets the requirements of ASTM D6868-11 Standard Specification for compostability.

15. The paperboard structure of claim 1, wherein the thickness of the heat sealable biopolymer coating is from 0.00033 to 0.0025 inches.

16. The paperboard structure of claim 1, wherein the thickness of the heat sealable biopolymer coating is from 0.0005 to 0.0015 inches.

17. The paperboard structure of claim 1, wherein the heat sealable biopolymer coating comprises both the inorganic melt curtain stabilizer and the adhesion-promoting polymer.

18. A paperboard structure comprising:
   a paperboard substrate having a first surface and an opposed second surface; and
   a heat sealable biopolymer coating applied by extrusion or co-extrusion to at least one of the first and second surfaces;
   wherein the heat sealable biopolymer coating is comprised of polylactic acid, an adhesion-promoting polymer, and an inorganic melt curtain stabilizer,
   wherein the inorganic melt curtain stabilizer is from 2% to 12% by weight of the heat sealable biopolymer coating, and
   wherein the thickness of the heat sealable biopolymer coating is from 0.00025 to 0.005 inches.

19. The paperboard structure of claim 18, wherein the inorganic melt curtain stabilizer comprises at least one of calcium carbonate, talc, mica, diatomaceous earth, silica, clay, kaolin, wollastonite, pumice, zeolite, and ceramic spheres.

20. The paperboard structure of claim 18, wherein the heat sealable biopolymer coating is one of a monolayer blend and a co-extruded multilayer blend.

21. The paperboard structure of claim 18, wherein the adhesion-promoting polymer comprises at least one of aliphatic-aromatic copolyester, polybutylene succinate, polyhydroxyalkanoate, aliphatic-polyester, aliphatic-aromatic polyester, acrylic polymer, elastomer, and plasticizer.

* * * * *